United States Patent

[11] 3,583,809

[72] Inventor Bernard Louis Yves Dubuisson
 Paris, France
[21] Appl. No. 845,687
[22] Filed July 29, 1969
[45] Patented June 8, 1971
[73] Assignee Societe Francaise D'Optique Et Di
 Mecanique S.F.O.M.
 Rueil-Matmaison, France
[32] Priority Aug. 1, 1968
[33] France
[31] 161,585

[54] APPARATUS FOR OBTAINING
 ORTHOPHOTOPLANS
 10 Claims, 4 Drawing Figs.
[52] U.S. Cl................................................ 355/22,
 353/6, 353/7, 353/30
[51] Int. Cl........................................................ G03b 27/32,
 G03b 35/14
[50] Field of Search........................................... 355/22;
 353/6, 10, 11, 7, 30

[56] References Cited
 UNITED STATES PATENTS
3,486,820 12/1969 Bladnit et al.................... 355/22

Primary Examiner—Samuel S. Matthews
Assistant Examiner—Daniel J. Clement
Attorney—Waters, Roditi, Schwartz & Nissen ABSTRACT: Apparatus for obtaining colored orthophotoplans comprises two white light projectors providing convergent beams projecting corresponding portions of a stereoscopic pair of color photographic transparencies onto a table disposed at an adjustable distance from the projectors and carrying a color-sensitive surface. A reference mark is disposed a small distance from the table and can be brought into the zone of convergence of the projector beams. A stereoscopic observation system allows the reference mark and projected images to be observed, such system including means for periodically and alternately obturating the beams in synchronism with alternate masking of the fields of view of an observer's eyes. A periodic masking means allows only one of the beams to reach the sensitive surface at a time whilst permitting observation of the projected images and reference mark at all times. A movable screen covers the sensitive surface and has a slot disposable at the zone of convergence of the beams. Various embodiments of masking means are envisaged for periodically uncovering the slot, namely a reciprocable thin sheet, a rotatable apertured shutter in the form of a closed loop and a rotatable disc with opaque and transparent regions.

PATENTED JUN 8 1971 3,583,809

APPARATUS FOR OBTAINING ORTHOPHOTOPLANS

This invention relates to apparatus for obtaining orthophotoplans.

Apparatus of this type, which is often used for the stereoscopic restoration of aerial photographs to enable the plotting of geographical maps, generally comprises two projectors in which are mounted a stereoscopic pair of transparencies and which are adapted to provide convergent beams projecting images of portions of the photographs corresponding to a given portion of the subject onto a table which is situated at an adjustable distance from the projectors. The table carries a movable reference mark disposed at a short, constant distance from this table, such that, for each subject portion projected, the reference mark is placed in the zone of convergence of the beams and the photographs and beams occupy positions substantially corresponding to those which, when the photographs were taken, were occupied by these photographs and the beams coming from the subject.

If the pair of transparencies to be projected are black and white, it is well known that these two transparencies can be projected onto the table by means of beams of monochromatic light which are different for each transparency.

The images of the transparencies so projected are then observed stereoscopically by means, for example, of colored filters corresponding to the colors of the projection beams and placed in front of the eyes of an observer looking at the table.

A photographic reproduction (or orthophotoplan), on a sensitive surface situated on the table, of the image resulting from projection of one of the transparencies, is obtained by providing on the table a surface which is sensitive only to the light of the beam projecting the transparency concerned and by placing the reference mark, for each subject portion projected, in the zone of convergence of the beams projecting this portion.

If the pair of transparencies are in color and the projectors white light, it is well-known that the projected images can be observed stereoscopically with the aid of means for stereoscopic observation of the reference mark and images which are adapted periodically and alternately to intercept the beams emitted by the projectors in synchronization with alternate masking of the fields of view of the eyes of an observer looking at the table.

However, it has not yet been possible to reproduce the transparencies photographically in color, i.e. to obtain color orthophotoplans.

The principal object of the invention is therefore to meet this need and to provide apparatus adapted to give, in color, a photographic reproduction (or orthophotoplan) of the image resulting from projection of one of the transparencies.

Accordingly, the present invention provides apparatus for obtaining orthophotoplans, comprising: two white light projectors for projecting a stereoscopic pair of color photographic transparencies and arranged to direct convergent beams projecting images of portions of the transparencies corresponding to a given portion of the subject of the photograph onto a table situated at an adjustable distance from the projectors and receiving a color-sensitive surface, the table carrying a movable reference mark spaced a short constant distance from the table, the arrangement being such that, for each portion of the subject projected, the reference mark is placed in the zone of convergence of the beams and the transparencies occupy positions relative to the projector beams substantially corresponding to their positions relative to the beams coming from the subject portion concerned when the photograph was taken; means for stereoscopically observing the reference mark and the images of the projected portions and adapted periodically and alternately to intercept the projector beams in synchronization with alternate masking of the fields of view of the eyes of an observer looking at the table; and periodic masking means for permitting only the beam from one of the projectors to reach the color-sensitive surface, such masking means constantly permitting simultaneous observation of the reference mark and of the images projected by the two projectors.

In order that the invention may be clearly understood, embodiments thereof will now be described, by way of example, with reference to the accompanying drawing, in which.

Figure 1:
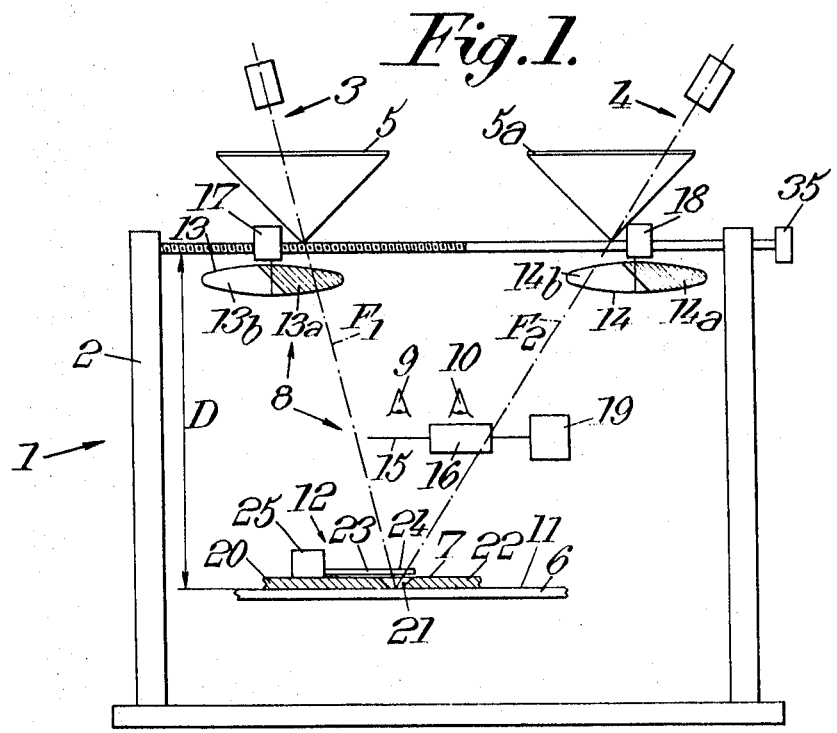
FIG. 1 is a diagrammatic side view of apparatus embodying the invention.

Referring to FIG. 1, apparatus 1 embodying the invention is provided with a framework 2 supporting two projectors 3 and 4, each of which includes a source of white light. A respective one of a pair of stereoscopic color transparencies 5 and 5a is mounted in each of projectors 3 and 4 which emit convergent beams $F_1$ and $F_2$ projecting images of portions of the transparencies 5 and 5a corresponding to a given portion of the subject onto a table 6 disposed at an adjustable distance D from the projectors 3 and 4.

In FIG. 1, the beams $F_1$ and $F_2$ are represented diagrammatically as rays, but are in reality, of course, beams having appreciable cross sections.

The table 6 bears a movable reference mark 7 situated at a short, constant distance from the table such that, for each portion of the subject projected, the reference mark 7 is in the zone of convergence of the beams $F_1$ and $F_2$, the transparencies 5 and 5a and beams $F_1$ and $F_2$, occupying positions substantially corresponding to those which, when the photographs were being taken, were occupied by these photographs and the beams from the subject portion concerned.

The apparatus 1 also comprises means 8 for stereoscopic observation of the reference mark 7 and of the projected images, such means being adapted periodically and alternately to intercept the beams $F_1$ and $F_2$ from the projectors 3 and 4, in synchronization with alternate masking of the fields of view of the eyes 9 and 10 of an observer looking at the table 6.

A color-sensitive surface 11 is situated on the table 6, and periodic masking means 12 is adapted to allow only the beam ($F_1$ or $F_2$) from one of the projectors (3 or 4) to pass to surface 11, whilst permitting constant, simultaneous observation of the reference mark 7 and of the images projected by the beams $F_1$ and $F_2$ from both projectors 3 and 4.

In a first form of apparatus embodying the invention, the respective periods for which the means 8 intercepts the beam $F_1$ or $F_2$ are equal, the periodic masking means 12 being such that, during a first period, it intercepts the beam $F_2$ or $F_1$ which is not intercepted by the means 8 and, during a second period, it allows that beam $F_1$ or $F_2$ which is not intercepted by the means 8 to pass to the sensitive surface 11.

In a second form of apparatus embodying the invention, the periods for which the device 8 intercepts the beam $F_1$ (or $F_2$) emitted by the projector 3 (or 4) are twice as long as the periods during which the means 8 intercepts the beam $F_2$ (or $F_1$) emitted by the projector 4 (or 3), the periodic masking means 12 being such that, during a first period, it intercepts the beam $F_1$ (or $F_2$) which is not intercepted by the means 8, during a second period it intercepts the beam $F_2$ (or $F_1$) which is not intercepted by the means 8, and during a third period it allows that beam $F_2$ (or $F_1$) which is not intercepted by the means 8 to pass to the sensitive surface 11.

The apparatus 1 illustrated in FIG. 1 corresponds to the first embodiment just mentioned.

The stereoscopic observation means 8 thus comprises, for example, firstly, two rotary discs 13 and 14 situated in the field of the projectors 3, 4 and having opaque portions 13a, 14a and transparent portions 13b, 14b of equal area, and, secondly, two opaque rotating plates 15, 16 at right angles, respectively situated in the fields of view of the eyes 9, 10 of the observer looking at the table 6.

Figure 1 schematically shows the observer's eyes in the plane of the beams $F_1$ and $F_2$. In reality, however, this is not the case since the beams must be able to reach the table 6.

The discs 13 and 14 and the plates 15 and 16 are respectively driven by synchronous motors 17, 18 and 19, and are keyed onto their respective driving shafts so that, during equal intervals of time, the field of view of the observer's right eye 10 is clear at the same time as the right-hand beam $F_2$, whereas the field of view of the left eye 9 is masked at the same time as the left-hand beam $F_1$ is intercepted (as shown in FIG. 1), and vice versa.

The observer therefore has a stereoscopic view of the images projected by the beams $F_1$, $F_2$. The speed of rotation of the motors 17—19 is chosen to be high enough so that the images observed do not appear to flicker.

However, the beams $F_1$ and $F_2$ project the transparencies 5 and 5a in color, and, since neither of the two beams is nonactinic for the sensitive surface 11, the usefulness—for making a color orthophotoplan—of the novel periodic masking means 12 (which admits only one of the beams $F_1$ or $F_2$ to this sensitive surface 11) will be readily understood.

In most cases, the apparatus 1 described also includes, in order to ensure correct exposure of the sensitive surface 11, a movable screen 20 which covers at least part of the sensitive surface 11 and contains a slot 21, adapted to be placed, for each portion of the subject projected, in the zone of convergence of the beams $F_1$, $F_2$.

In this case, the reference mark 7 already mentioned may be on the movable screen 20, on that face 22 of it which is directed towards the observer. This reference mark is near the slot 21 and is formed in this embodiment as a line visible to the observer.

Successive, adjacent strips of the sensitive surface 11 can therefore be exposed, the exposure time depending on the rate of displacement of the slot 21.

This being so, an advantageous embodiment of the periodic masking means 12 (illustrated in FIGS. 1 and 2) comprises a thin sheet 23 adapted to reciprocate in the direction A in a plane adjacent to the front face 22 of the screen 20, so that it periodically masks the slot 21 without covering the reference mark 7. The face 24 of the sheet 23 which is directed towards the observer is of a color (such as white) which enables the observer to see the images projected onto the sheet 23 when it is masking the slot 21.

The alternative motion of the sheet 23 may be produced by vibrating means, for example an electromagnet 25 whose operation is synchronized with that of the discs 13 and 14.

Advantageously, the sheet 23 and electromagnet 25 are mounted on the screen 20.

Figures 2, 3:
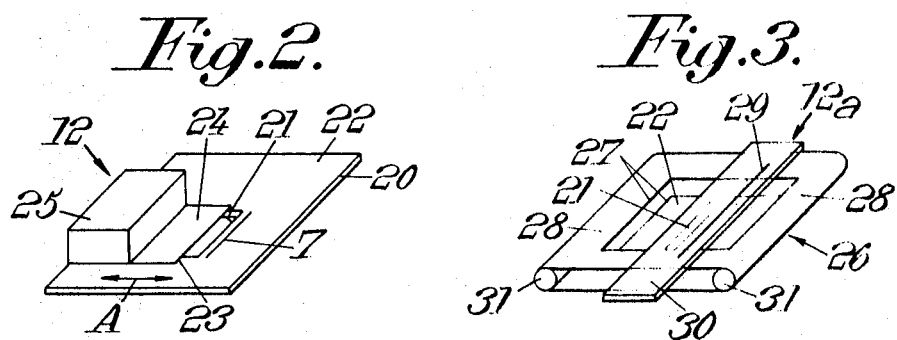
FIG. 2, 3 and 4 illustrate three embodiments of periodic masking means for the apparatus of FIG. 1.

Another embodiment of periodic masking means 12a illustrated in FIG. 3, comprises a rotating shutter 26 in the form of a closed loop which passes through two parallel planes in the vicinity of the table 6 and which contains two windows 27 which each extend along one-quarter of the length of the shutter 26 and are separated from one another by opaque portions 28, each extending along one-quarter of the length of the shutter 26.

Like the masking means 12 of FIG. 2, the shutter has a color (e.g. white) such that the observer can see the images projected onto the shutter 26 while it is obturating the slot 21.

However, it is no longer possible for the reference mark to be situated on the face 22 of the screen 20. Advantageously, there may be a reference mark 29 on a transparent plate 30, which is suspended over the shutter 26 in such a way that this reference mark is near the slot 21 and at a constant distance from the sensitive surface 11.

The shutter 26 may be driven by a synchronous motor (not shown), which operates one of the rollers 31 carrying the shutter 26 synchronously with the rotation of the discs 13, 14.

The operating cycles of the two embodiments already described are in two stages.

During a first stage or period, for example in order to make an orthophotoplan from the transparency 5a, the beam $F_2$ and the field of view of the right eye 10 are respectively masked by the disc 14 and plate 16, whereas the beam $F_1$ and the field of view of the left eye 9 are not. Also, the slot 21 is masked, either by the sheet 23 (FIGS. 1 and 2) or by the shutter 26 (FIG. 3).

As a result, the observer sees with his left eye 9 the image of that portion of the transparency 5 projected by the beam $F_1$ onto the sheet 23 (or shutter 26) and the reference mark 7 (or the reference mark 29 suspended over the shutter 26), but no photographic reproduction is made.

During the second period, the beam $F_1$ and the field of view of the left eye 9 are respectively masked by the disc 13 and plate 15, whereas the beam $F_2$ and the field of view of the right eye 10 are not. Also, the slot 21 is revealed by the sheet 23 or shutter 26 (the windows 27 of which are now aligned with the slot).

The beam $F_2$ produces an image on the sensitive surface 11 by projecting onto this surface the image of part of the transparency 5a while the right eye 10 observes the reference mark 7 (or 29) and this image. An orthophotoplan is therefore formed from the projection of the transparency 5a by means of the beam $F_2$.

Each of the observer's eyes therefore sees an image with a frequency equal to half of the cycle described above. By way of example, this frequency might be at least 50 Hz.

In the case of apparatus 1 corresponding to the second embodiment mentioned at the beginning of this description and to be used, for example, for making an orthophotoplan of the photograph 5, a new disc (not shown) with an opaque portion equal to 120° and a transparent portion equal to 240° should be substituted for the disc 13, and another new disc (not shown) with an opaque portion equal to 240° and a transparent portion equal to 120° should be substituted for the disc 14.

Also, the plates 15 and 16 may be replaced by two rotating discs (not shown), respectively inserted in the fields of view of the observer's eyes 9, 10 and each having an opaque portion equal to 240° and a transparent portion equal to 120°.

These four discs may, for example, be operated by synchronous motors so that, during an interval corresponding to one rotation of each of these discs through 360°, the beam $F_1$ is intercepted during the first third of this interval, the beam $F_2$ is intercepted for the second and third thirds of this interval, the field of view of the left eye 9 of the observer is masked during the first and third thirds of this interval and is clear during the second third, and the field of view of the right eye 10 of the observer is clear during the first third and masked during the second and third thirds of this interval.

Figure 4:
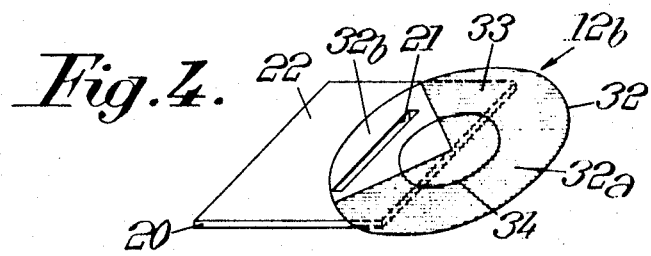

To make an orthophotoplan from the transparency 5, it is necessary to have periodic masking means adapted to mask the slot 21 during the first two-thirds of the said interval and to admit the beam F1 to the sensitive surface 11 during the last third of this interval. Such periodic masking means may, for example, take the form of the means 12b illustrated in FIG. 4.

The means 12b has a rotary disc 32 having an opaque sector 32a equal to 240° and a transparent sector 32b equal to 120°. The disc is placed adjacent to the face 22 of the screen 20 so that it sweeps the slot 21. That face 33 of the disc directed towards the observer bears a reference mark 34 in the form of a circle centered on the axis of rotation of the disc and passing near the slot 21. The opaque sector 32a has a color (e.g. white) such that the observer can see the images projected onto this sector 32a when it is masking the slot 21. The disc 32 is driven by a synchronous motor.

For this embodiment, the operating cycle is in three stages.

During a first period, the beam $F_1$ and the field of view of the left eye 9 are masked and the beam $F_2$ and the field of view of the right eye 10 are not. Also, the slot 21 is masked by the opaque sector 32a of the disc 32. As a result, the observer sees with his right eye 10 the reference mark 34 and the image of that portion of the photograph 5a projected by the beam $F_2$ onto the opaque sector 32a, but no photographic reproduction takes place.

During a second period, the beam $F_2$ and the field of view of the right eye 10 are masked, and the beam $F_1$ and the field of view of the right eye 9 are not. The slot is still masked by the opaque sector 32a. As a result, the observer sees with his left eye 9 the reference mark and the image of that portion of the photograph 5 which is protected by the beam $F_1$ onto the opaque sector 32a, but no photographic reproduction takes place.

During a third period, the beam $F_2$ and the fields of view of both eyes 9, 10 are masked, and the beam $F_1$ is not. The transparent sector 32b of the disc 32 is over the slot 21. The beam $F_1$ produces an image on the sensitive surface 11, by projecting the image of part of the photograph 5 onto this surface through the slot 21. An orthophotoplan of the transparency 5 is therefore made.

Advantageously, the reference marks 7, 29, 34 are in the form of lines engraved or drawn respectively on the face 22 of the screen 20, the sheet 30, and the face 33 of the disc 32. Alternatively, of course, these reference marks could be produced in any other manner, e.g. by projecting a pencil of light onto the face 22 of the screen 20. As a general rule, however, the reference mark is kept at a constant and appreciable distance from the table 6 bearing the sensitive surface 11.

Since the observer places the reference mark in the zone of convergence of the beams $F_1$, $F_2$, it is necessary to provide preliminary, correlative compensation of the stereoscopic model formed by the two transparencies 5 and 5a, for example by reducing the spacing of the projectors 3 and 4 by a fixed amount, using a screw adjustment system 35.

During operation, the beams $F_1$ and $F_2$ (which have appreciable cross sections) project the images of portions of the transparencies either onto the sheet 23 (or the shutter 26 or disc 32) or onto the slot 21 and the zones of the screen 20 adjacent to this slot.

Thanks to his stereoscopic view of the reference mark and images, therefore, the observer can adjust continuously the distance D between the table 6 and the projectors 3 and 4, for each subject portion projected.

It should be noted that the periodic masking means 12 could be used equally well with apparatus 1 operating on a three-stage cycle as described above. It would merely be necessary to modify the control mechanism for the electromagnet 25, so that the sheet 23 masks the slot 21 during the first two periods and not during the last.

The periodic masking means 12a, also, might be used with apparatus 1 operating on a three-stage cycle as described above. If so, the shutter would contain two windows which each extend over one-sixth of the length of the shutter and are separated by opaque portions each extending over one-third of the length of the shutter.

Other embodiments of the invention are also possible. For example, one might use discs with a succession of uniformly distributed opaque and transparent portions of equal or double area.

As a result, and whatever the embodiment adopted, apparatus for obtaining orthophotoplans is provided which well attains the object proposed and which can give an orthophotoplan in colors from photographs without interfering with the stereoscopic observation which is essential to continuous adjustment of the distance between the table and the projectors.

What I claim is:

1. Apparatus for obtaining orthophotoplans, comprising: two white light projectors providing convergent beams of light; means for mounting a stereoscopic pair of color transparencies in said projectors for projection by said convergent beams of light; a table spaced from said projectors onto which said convergent beams project images of portion of the transparencies corresponding to a given portion of the subject of the photograph; means for adjusting the distance of said table from said projectors; a movable reference mark carried by said table a short, constant distance from said table; the arrangement being such that, for each subject portion projected, the reference mark is placed in the zone of convergence of the beams and the positions of the transparencies relative to the beams substantially correspond to their positions relative to the beams coming from the subject portion concerned during photographing; means for stereoscopically observing said reference mark and the projected images; first interceptor means in said stereoscopic observation means for periodically and alternately intercepting the projector beams; and second interceptor means in said stereoscopic observation means for alternately masking the fields of view of the eyes of an observer looking at the table in synchronism with said means for periodically and alternately intercepting the projector beams; wherein the improvement comprises: a color-sensitive surface situated on said table; and periodic masking means disposed adjacent said table operative to allow only the beam from one of said projectors to reach said color-sensitive surface whilst permitting constant simultaneous observation of said reference mark and of the images projected by the beams from said two projectors.

2. Apparatus as claimed in claim 1, wherein the respective periods during which said first interceptor means intercept the beams from said two projectors are equal; said periodic masking means being such that, during a first period, it intercepts that beam which is not intercepted by said first interceptor means and, during a second period, it allows that beam not intercepted by said first interceptor means to reach said color-sensitive surface.

3. Apparatus as claimed in claim 1, wherein the periods during which a first beam from one of said projectors is intercepted by said first interceptor means are twice as long as the periods during which a second beam from the other of said projectors is intercepted; said masking means being such that, during a first period, it intercepts the first beam which is not intercepted by said first interceptor means, during a second period, it intercepts the second beam which is not intercepted by said first interceptor means and, during a third period, it allows the second beam which is not intercepted by said first interceptor means to reach the sensitive surface.

4. Apparatus as claimed in claim 2, further comprising: a movable screen arranged to cover said sensitive surface and formed with a slot which, for each subject portion projected, can be placed in the zone of convergence of said beams; and a reference mark near the slot on the front face of said screen which is directed toward the observer.

5. Apparatus as claimed in claim 4, wherein said periodic masking means comprises: a thin sheet having that face which is directed toward the observer of a color which enables the observer to see the images projected onto it; and means for reciprocating said sheet in a direction in a plane adjacent to the front face of said movable screen, so that said sheet periodically masks the slot without covering said reference mark.

6. Apparatus as claimed in claim 4, wherein said periodic masking means comprises: a rotatable shutter in the form of a close loop which passes through two parallel planes in the vicinity of the front face of said movable screen and which is provided with windows separated by opaque portions of a color which permits the observer to see the images projected thereon; means for rotating said shutter; a transparent plate suspended over said shutter; and a reference mark disposed on said transparent plate in the proximity of the slot in said movable screen.

7. Apparatus as claimed in claim 4, wherein said periodic masking means comprises: a rotatable disc having an opaque sector and a transparent sector and disposed adjacent the front face of said movable screen, the opaque sector being of a color such that the observer can see the images projected thereon; means for rotating said disc so that it sweeps over the slot in said movable screen; and a reference mark near the slot on the movable screen on that face of said disc which is directed towards the observer, said mark being in the form of a circle centered on the axis of rotation of said disc.

8. Apparatus as claimed in claim 3, further comprising: a movable screen arranged to cover said sensitive surface and formed with a slot which, for each subject portion projected, can be placed in the zone of convergence of said beams; and a reference mark near the slot on the front face of said screen which is directed towards the observer; and wherein said periodic masking means comprises: a thin sheet having that face which is directed towards the observer of a color which enables the observer to see the images projected onto it; and means for reciprocating said sheet in a direction in a plane adjacent to the front face of said movable screen, so that said sheet periodically masks the slot without covering said reference mark.

9. Apparatus as claimed in claim 3, further comprising: a movable screen arranged to cover said sensitive surface and formed with a slot which, for each subject portion projected, can be placed in the zone of convergence of said beams; and a reference mark near the slot on the front face of said screen which is directed towards the observer; and wherein said periodic masking means comprises: a rotatable shutter in the form of a closed loop which passes through two parallel planes in the vicinity of the front face of said movable screen and which is provided with windows separated by opaque portions of a color which permits the observer to see the images projected thereon; means for rotating said shutter; a transparent plate suspended over said shutter; and a reference mark disposed on said transparent plate in the proximity of the slot in said movable screen.

10. Apparatus as claimed in claim 3, further comprising: a movable screen arranged to cover said sensitive surface and formed with a slot which, for each subject portion projected, can be placed in the zone of convergence of said beams; and a reference mark near the slot on the front face of said screen which is directed towards the observer; and wherein said periodic masking means comprises: a rotatable disc having an opaque sector and a transparent sector and disposed adjacent the front face of said movable screen, the opaque sector being of a color such that the observer can see the images projected thereon; means for rotating said disc so that it sweeps over the slot in said movable screen, on that face of said disc which is directed towards the observer, said mark being in the form of a circle centered on the axis of rotation of said disc.